(12) United States Patent
Hipshier et al.

(10) Patent No.: US 10,023,125 B2
(45) Date of Patent: Jul. 17, 2018

(54) CONSOLE FOR VEHICLE INTERIOR

(71) Applicant: Shanghai Yanfeng Jinqiao Automotive Trim Systems Co., Ltd., Plymouth, MI (US)

(72) Inventors: Jason M. Hipshier, Zeeland, MI (US); Danny B. Larsen, Holland, MI (US); Tyler J. Newkirk, Grand Rapids, MI (US); Randal John VanHoof, Zeeland, MI (US)

(73) Assignee: Shanghai Yanfeng Jinqiao Automotive Trim Systems Co., Ltd., Plymouth, MI (US)

( * ) Notice: Subject to any disclaimer, the term of this patent is extended or adjusted under 35 U.S.C. 154(b) by 0 days.

(21) Appl. No.: 15/068,637

(22) Filed: Mar. 13, 2016

(65) Prior Publication Data

US 2016/0193967 A1 Jul. 7, 2016

Related U.S. Application Data

(63) Continuation of application No. PCT/US2014/055221, filed on Sep. 11, 2014.
(Continued)

(51) Int. Cl.
*B60R 7/04* (2006.01)
*B60N 3/10* (2006.01)

(52) U.S. Cl.
CPC . *B60R 7/04* (2013.01); *B60N 3/10* (2013.01)

(58) Field of Classification Search
CPC ...... B60N 2/4686; B60N 3/101; B60N 3/102; B60N 3/106; B60N 2/4606; B60N 3/10;
(Continued)

(56) References Cited

U.S. PATENT DOCUMENTS 7,287,795 B1 * 10/2007 Thomas .................... B60R 7/04
296/24.34
7,475,954 B1 * 1/2009 Latunski ................ B60R 11/00
296/24.34
(Continued)

FOREIGN PATENT DOCUMENTS

DE 102006013969 A1 10/2007
DE 102009030350 A1 12/2010
WO 2013/053348 A1 4/2013

OTHER PUBLICATIONS

International Preliminary Report on Patentability dated Mar. 15, 2016 for PCT/US2014/055221.
(Continued)

*Primary Examiner* — D Glenn Dayoan
*Assistant Examiner* — Sunsurraye Westbrook
(74) *Attorney, Agent, or Firm* — Amin, Turocy & Watson, LLP

(57) ABSTRACT

A vehicle console is disclosed. The console includes a support structure and a track extending along the support structure. The vehicle console also includes a tambour door supported by the track. The track includes a first track section, a second track section and a third track section. The first track section, the second track section and the third track section extend from a single junction. The tambour door is configured to slide within the first track section, the second track section and the third track section.

18 Claims, 4 Drawing Sheets

Related U.S. Application Data

(60) Provisional application No. 61/877,683, filed on Sep. 13, 2013.

(58) Field of Classification Search
CPC .. B60N 3/108; B60R 7/04; B60R 7/06; B60R 11/00; B60R 2011/0007; B60R 2011/0094; B60R 11/02; B60R 2011/0075
USPC ...... 296/24.34, 37.8, 37.1, 70, 191, 214, 64, 296/75; 29/428, 453, 525, 527.1
See application file for complete search history.

(56) References Cited

U.S. PATENT DOCUMENTS

| | | | | |
|---|---|---|---|---|
| 8,007,020 B2* | 8/2011 | Hipshier | .................. | B60R 7/04 |
| | | | | 296/24.34 |
| 8,596,714 B2* | 12/2013 | Whitman | ................ | B60R 7/043 |
| | | | | 224/275 |
| 9,481,323 B2* | 11/2016 | Hipshier | ............. | B29C 45/1676 |
| 2003/0052129 A1* | 3/2003 | Fukuo | ................... | B60N 3/102 |
| | | | | 220/350 |
| 2006/0037713 A1* | 2/2006 | Ichimaru | .................. | B60R 7/04 |
| | | | | 160/37 |
| 2012/0074726 A1 | 3/2012 | Takai et al. | | |

OTHER PUBLICATIONS

International Search Report dated Oct. 29, 2014 for PCT/US2014/055221.

* cited by examiner

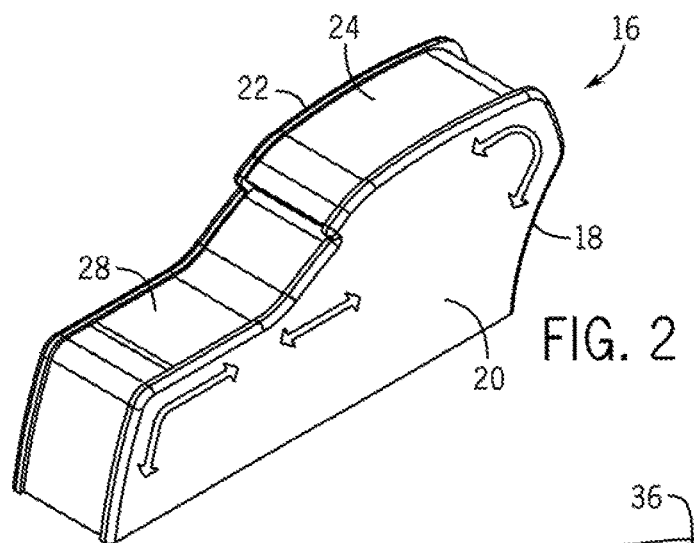
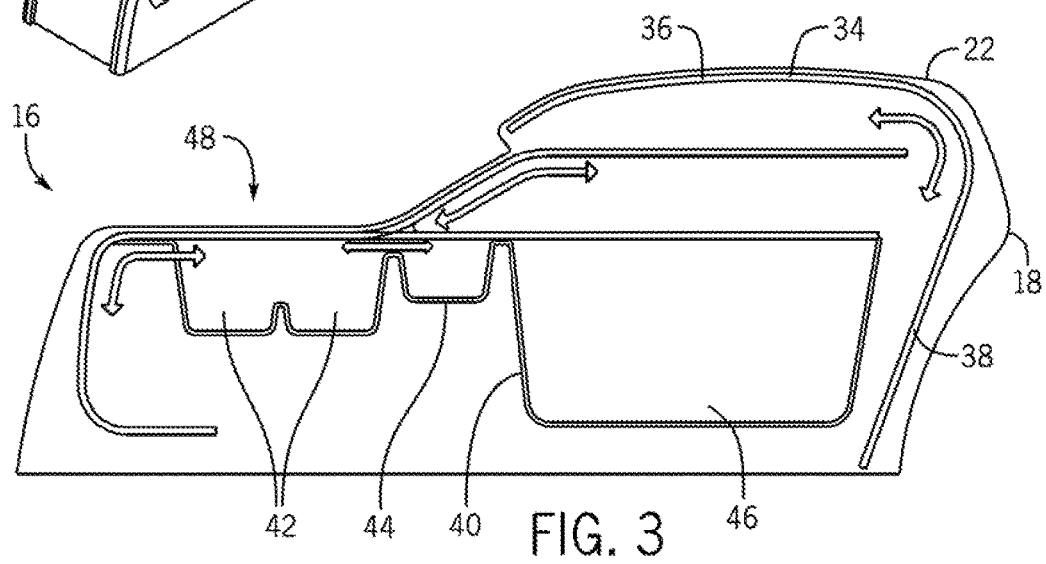
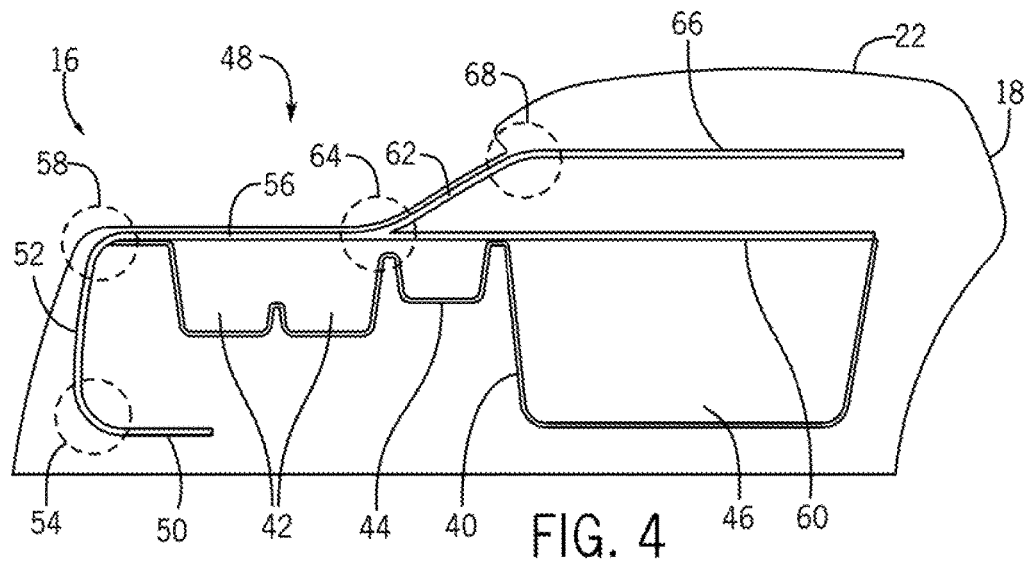

CONSOLE FOR VEHICLE INTERIOR

CROSS REFERENCE TO RELATED APPLICATION

The present application is a continuation of PCT Application No. PCT/US2014/55221 titled "VEHICLE CONSOLE HAVING A TRACK FOR MOVING A TAMBOUR DOOR BETWEEN MULTIPLE POSITIONS" filed Sep. 11, 2014. The present application claims priority from and the benefit of and incorporates by reference in entirety the following applications: (a) U.S. Provisional Patent Application Ser. No. 61/877,683, entitled "VEHICLE CONSOLE HAVING A TRACK FOR MOVING A TAMBOUR DOOR BETWEEN MULTIPLE POSITIONS", filed Sep. 13, 2013; (b) PCT Application No. PCT/US2014/55221 titled "VEHICLE CONSOLE HAVING A TRACK FOR MOVING A TAMBOUR DOOR BETWEEN MULTIPLE POSITIONS" filed Sep. 11, 2014.

FIELD

The present invention relates to a console for a vehicle interior. The present invention also relates to a vehicle console having a track for moving a tambour door between multiple positions.

BACKGROUND

Vehicles may include storage compartments positioned throughout the vehicle interior. An overhead console may include a storage compartment suitable for storing sunglasses, driving glasses, or other items. Other storage compartments may be located within a center console, an armrest, seats, door panels, or other areas of the vehicle interior. Certain storage compartments include a door configured as a cover to secure the contents of the compartment (e.g. to conceal the contents from view).

It would be advantageous to provide an improvement to a console for a vehicle interior having a track for moving a tambour door between multiple positions.

SUMMARY

The present invention relates to a console for a vehicle interior. The console comprises a support structure, a track along the support structure and a tambour door supported by the track. The track comprises a first track section, a second track section and a third track section. The first track section, the second track section and the third track section extend from a junction. The tambour door is configured to slide within the first track section, the second track section and the third track section.

The present invention also relates to a component for a vehicle interior. The component comprises a support structure, a track along the support structure and a tambour door supported by the track. The track comprises a first track section, a second track section and a third track section. The first track section extends parallel to the third track section. The second track section connects the first track section to the third track section. The tambour door is configured to slide within the first track section, the second track section and the third track section.

The present invention further relates to a console for a vehicle interior. The console comprises a support structure comprising a storage area, a track system along the support structure and a tambour door configured for movement along the track system. The track system comprises a first track section, a second track section and a third track section. The first track section, the second track section and the third track section are joined at a first junction. The first track section, the second track section and the third track section are joined at a second junction. The first track section is configured to allow movement of the tambour door into a storage compartment within the support structure. The second track section is configured to allow movement of the tambour door above a first region of the storage compartment to block access to the first region. The third track section is configured to allow movement of the tambour door within a second region of the storage compartment to divide the second region into a first sub-region and a second sub-region. The tambour door is configured to slide within the first track section, the second track section, and the third track section.

FIGURES

FIG. 2 is a schematic perspective view of a console having a track with multiple track sections for moving a tambour door between multiple positions according to an exemplary embodiment.

FIG. 3 is a schematic cross-section view of a console according to an exemplary embodiment.

FIG. 4 is a schematic cross-section view of a console of showing individual track sections according to an exemplary embodiment.

DESCRIPTION

Figure 1A:
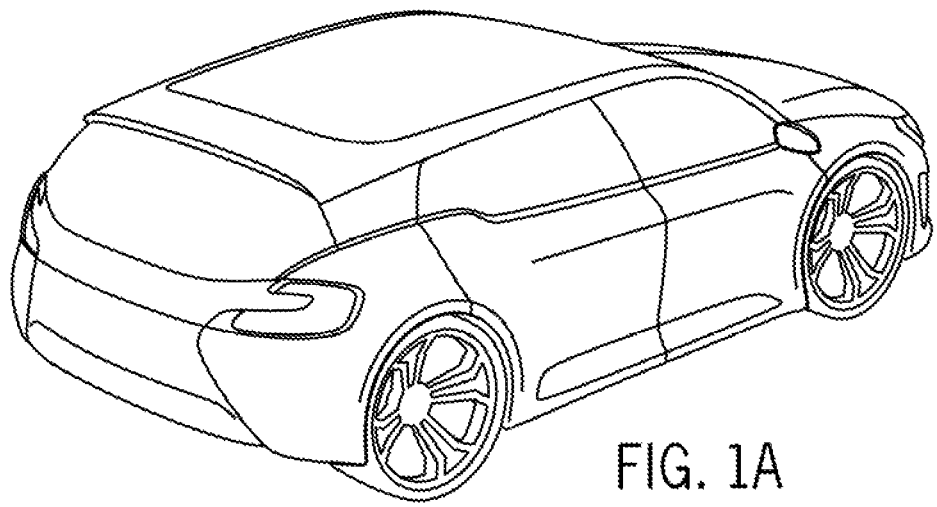
FIG. 1A is a schematic perspective view of a vehicle according to an exemplary embodiment.
Figure 1B:
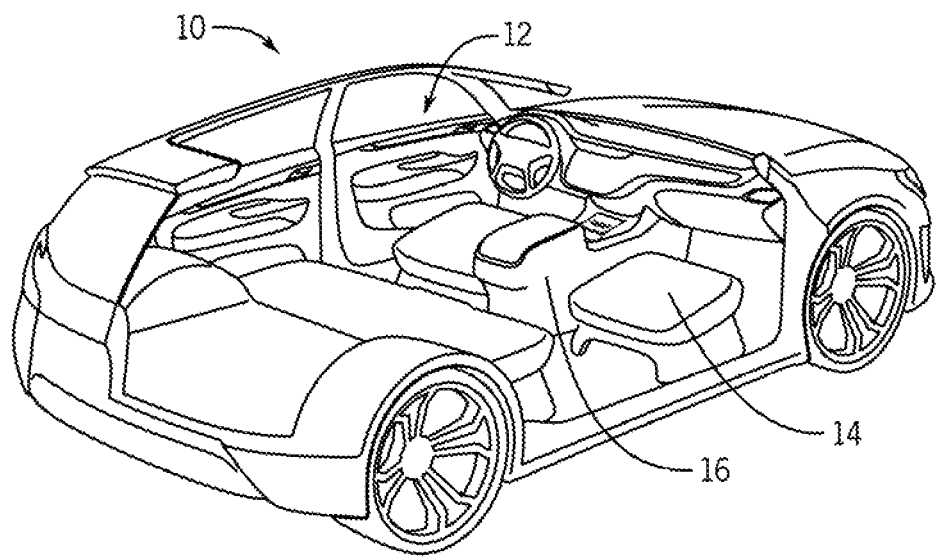
FIG. 1B is a schematic cut-away perspective view of a vehicle interior according to an exemplary embodiment.

As shown schematically in FIGS. 1A and 1B, a vehicle 10 is provided with an interior 12 having a seat 14 and a console 16 (e.g., floor console).

According to an exemplary embodiment, the vehicle interior may include a console having a track system comprising a track with multiple track sections for a tambour door movable between positions. See FIGS. 2 and 3. According to an exemplary embodiment, the console may include a tambour door configured to facilitate access to a storage compartment within the floor console. See FIG. 2. The tambour door may operate in a track system having multiple track sections to allow the tambour door to move to different positions. See FIG. 3. According to an exemplary embodiment, the tambour door may be employed in the console and/or other vehicle interior components such as a seat, a glove box, a door panel, and/or a rear seat assembly; the vehicle interior compartment may include the tambour door with the track system having multiple track sections that enable the tambour door to be moved in different configurations according to an exemplary embodiment. See FIG. 3.

As shown schematically in FIGS. 2 and 3, a console 16 includes a support structure; the track system extends along the support structure; the tambour door is supported by the track system. See FIGS. 2 and 3.

As shown schematically in FIG. 2, the console 16 may provide the track system with multiple track sections for moving the tambour door between multiple positions. The console 16 may comprise a support structure 18; the support structure 18 comprises the storage compartment configured to retain various items such as personal items, eye glasses, portable electronic devices, papers, among other items. See FIG. 3. According to an exemplary embodiment, the support structure 18 includes a side wall 20 and a side wall 22. See FIGS. 2 and 3.

As shown in FIG. 2, the tambour door 24 is configured to slide (e.g. in the track system) between a closed position and an opened position. At the closed position the tambour door 24 blocks an opening to the storage compartment; the open position facilitates access to the storage compartment. The vehicle occupant may slide the tambour door 24 rearward to access items within the storage compartment and then slide the tambour door 24 forward to close the storage compartment. See FIG. 2.

According to an exemplary embodiment as shown schematically in FIG. 2, the tambour door 28 in the support structure 18 may be configured to slide (e.g. in a track system) between positions relative to the support structure. The tambour door 28 may slide toward a front portion of the support structure 18; the tambour door 28 may slide toward a rear portion of the support structure 18. See FIG. 2. According to an exemplary embodiment, the tambour door 24 and/or tambour door 28 slide along tracks of the track system. The tracks may include multiple track sections to facilitate moving the tambour door 24 and/or the tambour door 28 to various positions. See FIGS. 2 and 3.

As shown schematically in FIG. 3, a track 34 is coupled to and extends along the wall 22 of the support structure 18. The tambour door 24 is in the track 34 and supported by the track 34. According to an exemplary embodiment the track 34 includes a first track section 36 that extends in a horizontal plane and a second track section 38 that extends in a vertical plane. The tambour door 24 in a closed position is primarily within the first track section 36; the first tambour door 24 in an opened position is primarily within the second track section 38. As shown schematically, the first track section 36 and the second track section 38 facilitate movement of the tambour door 24 between the closed position and the opened position.

As shown schematically in FIG. 3, the support structure 18 includes an assembly 40 that divides an interior compartment (e.g., storage volume/space or area) of the support structure 18 into various storage compartments. According to an exemplary embodiment, a storage compartment 42 may be used as a cup holder; a storage compartment 44 may be used to store small items; and a storage compartment 46 may be used to store large items. See FIG. 3. A track 48 extends along the wall 22 of the support structure 18. The track 48 includes multiple track sections for guiding movement of the tambour door 28 relative to the storage compartments; the track 48 supports the tambour door 28 for movement to cover the storage compartment 42, and/or the storage compartment 44, and/or the storage compartment 46; the tambour door 28 may operate as a shelf within the support structure 18. See FIGS. 3 and 4.

According to an exemplary embodiment, the track includes a first track section 50, a second track section 52 and a third track section 56. See FIG. 4. The first track section 50 and the third track section 56 extend in parallel; the second track section 52 connects the first track section 50 and the third track section 56. See FIG. 4. The first track section 50, the second track section 52 and the third track section 56 may extend from a single junction; the tambour door is configured to slide within the first track section 50, the second track section 52 and the third track section 56. See FIG. 4. The tambour door moves to different positions along the first track section 50, the second track section 52 and the third track section 56. The tambour door may slide within the track sections to configure storage compartments in a console 16. See FIGS. 3 and 4.

As shown schematically in FIG. 4, the track 48 includes the first track section 50 and the second track section 52 joined at the first junction 54. According to an exemplary embodiment, the first track section 50 extends in a horizontal plane; the second track section 52 extends in a vertical plane. See FIG. 4. The first junction 54 is curved to join the first track section 50 and the second track section 52. See FIG. 4. The track 48 may provide a second junction 58 to join the third track section 56 to the second track section 52. See FIG. 4. According to an exemplary embodiment, the second junction 58 is curved to join the second track section 52 and the third track section 56. See FIG. 4. The third track section 56 extends in a horizontal plane; the first track section 50 is parallel to the third track section 56. As shown schematically in FIG. 4, the first track section 50, the second track section 52 and the third track section 56 form a C-shape track. According to an exemplary embodiment, the first track section 50, the second track section 52 and the third track section 56 may be arranged to form a U-shape track or a ∩-shape track.

According to an exemplary embodiment, the first track section 50 and the second track section 52 may be configured to conceal (or hide) the tambour door in the storage location within the support structure 18; for example, the support structure 18 may be configured to conceal the tambour door (e.g., hide a substantial portion of the tambour door from view of the vehicle occupants) while the tambour door is in the storage location. See FIG. 4. According to an exemplary embodiment, the tambour door may have a length shorter than or corresponding to the length of the second track section 52. According to an exemplary embodiment (e.g. in the absence of the first track section), the second track section 52 may move the tambour door in the storage location. See FIG. 4. The third track section 56 may be configured to move the tambour door above a section or portion of the interior/storage area (e.g., above the storage compartment 42) to block access to the area. See FIG. 4. The tambour door may secure items within a region/storage compartment 42; the tambour door is positioned in the third track section 56. See FIG. 4. The tambour door may function as a tray (e.g., to support item disposed on top of the tambour door) while the tambour door is positioned within the third track section 56. See FIG. 4.

As shown schematically in FIG. 4, the track 48 may comprise a fourth track section 60 and a fifth track section 62. The third track section 56, the fourth track section 60 and the fifth track section 62 may be joined at a third junction 64.

See FIG. 4. The third track section 56 and the fourth track section 60 may be aligned or not aligned (as shown in FIG. 4). According to an exemplary embodiment, the third track section 56, the fourth track section 60 and the fifth track section 62 form a Y-shape track and the third junction 64 forms a Y-junction. According to an exemplary embodiment, the third track section 56, the fourth track section 60 and the fifth track section 62 may form a T-shape track (shown in FIG. 4), or any other suitable shape that enables the tambour door to transition between track sections; the third junction 64 may be a T-junction or any other suitable junction that enables the tambour door to transition between track sections.

As shown schematically in FIG. 4, the tambour door 28 is supported by the track 48; the tambour door 28 may slide between the third track section 56 and the fourth track section 60 or between the third track section 56 and the fifth track section 62. The third junction 64 blocks sliding of the tambour door 28 between the fourth track section 60 and the fifth track section 62. See FIG. 4. According to an exemplary embodiment, the third junction 64 may be configured to enable the tambour door 28 to slide between the fourth track section 60 and the fifth track section 62.

As shown schematically in FIG. 4, the fourth track section 60 is configured to move the tambour door within a region 46 of an interior/storage area (e.g., the storage compartment 40) to divide the region 46 into a top sub-region (e.g., the sub-region above the tambour door) and a bottom sub-region (e.g., the sub-region below the tambour door). The tambour door is positioned within the fourth track section 60; the tambour door may secure items disposed within the bottom sub-region. See FIG. 4. The tambour door may be positioned to establish an open storage volume within the top sub-region (e.g. providing an additional storage area within the console 16). (According to an exemplary embodiment, the fifth track section may be omitted and the third junction 64 may be a two-way junction that only joins the third track section 56 and the fourth track section 60. See FIG. 4.) According to an exemplary embodiment, the tambour door may move between the storage location, the location above the region 42 and the region 44 of the storage area, and the location in the region 46 of the storage area to divide the region 46 into the top sub-region and the bottom sub-region, etc. See FIGS. 3, 4 and 6.

According to an exemplary embodiment as shown in FIG. 4, the first track section 50 and the second track section 52 may be adjacent to the third track section 56 and the fourth track section 60; the first track section 50 and the second track section 52 may be adjacent to the third track section 56 and the fourth track section 60. The first track section 50 and the second track section 52 may be joined to the fourth track section 60 positioning the storage location of a tambour door in a rear portion of the support structure 18. See FIG. 4. According to an exemplary embodiment, the rear portion of the support structure 18 may be configured to conceal the tambour door while the tambour door is in the storage location. See FIG. 4.

As shown schematically in FIG. 4 according to an exemplary embodiment, the track 48 includes a sixth track section 66 joined to the fifth track section 62 at a fourth junction 68. The sixth track section 66 is parallel to the first track section 50, the third track section 56 and the fourth track section 60. The fourth track section 60 and the sixth track section 66 may be used to position the tambour door 28 in a horizontal position to function as a shelf of a storage compartment within the support structure 18. The tambour door 28 is configured to slide through the track 48; the tambour door 28 is configured to slide in each of the first track section 50, the second track section 52, the third track section 56, the fourth track section 60, the fifth track section 62 and the sixth track section 66 and in the first junction 54, the second junction 58, the third junction 64 and the fourth junction 68. See FIGS. 3 and 4. According to an exemplary embodiment each of the first track section 50, the second track section 52, the third track section 56, the fourth track section 60, the fifth track section 62 and the sixth track section 66 are straight. According to an exemplary embodiment, certain track sections (e.g., the first track section, the second track section, the third track section, the fourth track section, the fifth track section, the sixth track section) may be curved in shape. According to an exemplary embodiment, the tambour door 28 may be moved along the track in a variety of different positions within the console 16 without removing the tambour door 28 from the track 48. The tambour door 28 may be used to cover one or more of the storage compartments and/or may operate as a shelf within the support structure 18. See FIG. 4.

Figure 5:
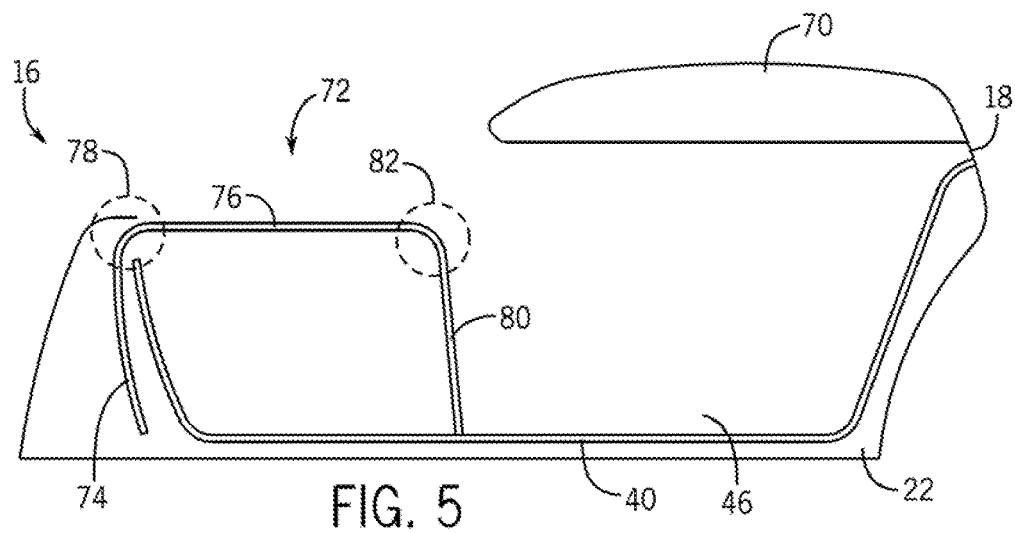
FIG. 5 is a schematic cross-section view of a console having a track configuration with multiple track sections for moving a tambour door between multiple positions according to an exemplary embodiment.

As shown schematically in FIG. 5, the console 16 may have a track configuration with multiple track sections for moving the tambour door between multiple positions according to an exemplary embodiment. As shown schematically in FIG. 5, the console 16 includes an armrest 70. The console 16 includes a track configuration 72 coupled to and extending along the wall 22 of the support structure 18. See FIG. 5. The track 72 includes a first track section 74 and a second track section 76 joined at a first junction 78. See FIG. 5. According to an exemplary embodiment, the first track section 74 extends in a vertical plane; the second track section 76 extends in a horizontal plane; the first junction 78 is curved to join the first track section 74 and the second track section 76. See FIG. 5. The track 72 also includes a third track section 80 joined to the second track section 76 at a second junction 82; the second junction 82 is curved to join the second track section 76 and the third track section 80. See FIG. 5. The third track section 80 extends in a vertical plane (e.g., the third track section 80 is perpendicular to the second track section 76); the first track section 74 and the third track section 80 extend parallel. As shown schematically in FIG. 5, the first track section 74, the second track section 76 and the third track section 80 form the ∩-shape track. According to an exemplary embodiment, the first track section 74, the second track section 76 and the third track section 80 may be arranged to form the U-shape track or the C-shape track.

As shown schematically in FIG. 5, the tambour door is configured to slide within the first track section 74, the second track section 76 and the third track section 80, and within the first junction 78 and the second junction 82. The tambour door may be positioned within one of the first track section 74, the second track section 76 and the third track section 80. Positioned within the first track section 74, the tambour door is in a storage location hidden from view (e.g., concealed within a support structure 18). See FIG. 5. According to an exemplary embodiment, the tambour door within the second track section 76 may move above a front region of the interior/storage area (e.g., above a front portion of the storage compartment 40), enabling the tambour door to function as a partial cover for the front region (e.g., to block access to the front region/portion of the storage compartment 40). See FIG. 5. The tambour door within the third track section 80 divides the storage compartment 40 into the front portion and the rear portion. See FIG. 5. According to an exemplary embodiment, the front sub-region corresponds to the front portion. The tambour door is within the third track section 80; the tambour door may block objects disposed within the front portion and/or the rear portion of the storage compartment 40 from moving into the adjacent portion. See FIG. 5.

Figure 6:
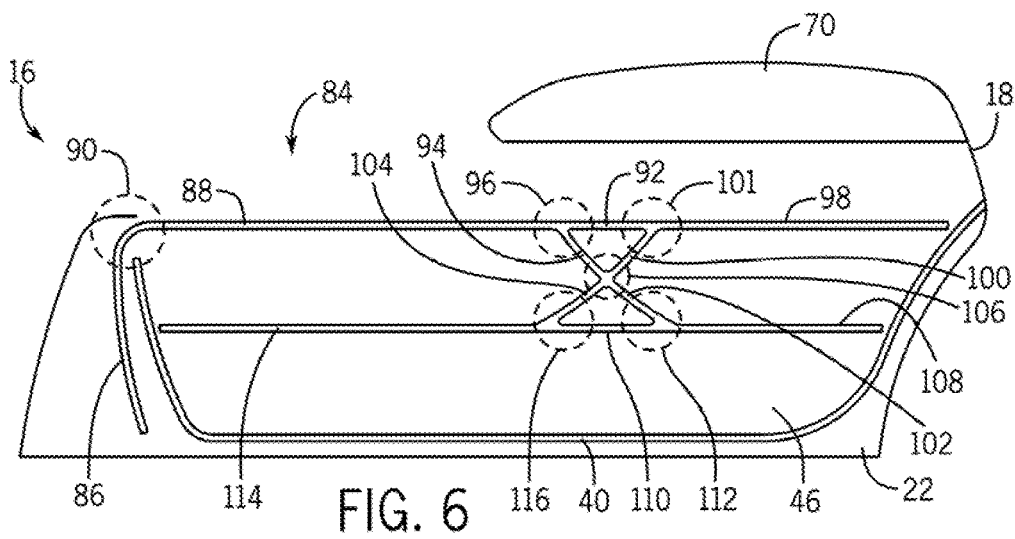
FIG. 6 is a schematic cross-section view of a console having a track configuration with multiple track sections for moving a tambour door between multiple positions according to an exemplary embodiment.

As shown schematically in FIG. 6, the console 16 may have a track configuration with multiple track sections for moving a tambour door between multiple positions according to an exemplary embodiment. The console 16 includes a track configuration 84 coupled to and extending along a wall 22 of a support structure 18. See FIG. 6. The track 84 includes a first track section 86 and a second track section 88 joined at a first junction 90. The first track section 86 extends in a vertical plane; the second track section 88 extends in a horizontal plane. The first junction 90 is curved to join the first track section 86 and the second track section 88. See FIG. 6. The track 84 also includes a third track section 92 and a fourth track section 94 joined to the second track section 88 at a second junction 96. The second junction 96 is a T-junction or a Y-junction to join the second track section 88, the third track section 92 and the fourth track section 94. The third track section 92 extends in a horizontal plane adjacent to the second track section 88. The second track section 88, the third track section 92 and the fourth track section 94 form a Y-shape track or a T-shape track. See FIG. 6.

The track 84 also includes a fifth track section 98 and a sixth track section 100 joined to the third track section 88 at a third junction 101. The third junction 101 is also the T-junction or the Y-junction and joins the third track section 92, the fifth track section 98 and the sixth track section 100. See FIG. 6. The fifth track section 98 extends in a horizontal plane adjacent to the third track section 92. The third track section 92, the fifth track section 98 and the sixth track section 100 form the Y-shape track or the T-shape track. See FIG. 6.

According to an exemplary embodiment, the track 84 includes a seventh track section 102 and an eighth track section 104 joined to the fourth track section 94 and the sixth track section 100 at a fourth junction 106. See FIG. 6. The fourth junction 106 is an X-junction and joins the fourth track section 94, the sixth track section 100, the seventh track section 102 and the eighth track section 104. See FIG. 6. The fourth track section 94, the sixth track section 100, the seventh track section 102 and the eighth track section 104 form an X-shape track. See FIG. 6.

As shown schematically in FIG. 6, the track 84 also includes a ninth track section 108 and a tenth track section 110 joined to the seventh track section 102 at a fifth junction 112. The fifth junction 112 is the T-junction or the Y-junction and joins the seventh track section 102, the ninth track section 108 and the tenth track section 110. See FIG. 6. The ninth track section 108 extends in a horizontal plane adjacent to the tenth track section 110; both the ninth track section 108 and the tenth track section 110 extend parallel to the second track section 88, the third track section 92 and the fifth track section 98. See FIG. 6. The seventh track section 102, the ninth track section 108 and the tenth track section 110 form the Y-shape track or the T-shape track. See FIG. 6.

As shown schematically in FIG. 6, the track 84 includes an eleventh track section 114 joined to the eighth track section 104 and the tenth track section 110 at a sixth junction 116. The sixth junction 116 is also the T-junction or the Y-junction and joins the eighth track section 104, the tenth track section 110 and the eleventh track section 114. See FIG. 6. The eleventh track section 114 extends in a horizontal plane adjacent to the tenth track section 110. See FIG. 6. The eighth track section 104, the tenth track section 110 and the eleventh track section 114 form the Y-shape track or the T-shape track.

As shown schematically in FIG. 6, the tambour door is configured to slide within the first track section 86, the second track section 88, the third track section 92, the fourth track section 94, the fifth track section 98, the sixth track section 100, the seventh track section 102, the eighth track section 104, the ninth track section 108, the tenth track section 110 and the eleventh track section 114; and the first junction 90, the second junction 96, the third junction 101, the fourth junction 106, the fifth junction 112 and the sixth junction 116. According to an exemplary embodiment, the tambour door may move within one of the first track section 86, the second track section 88, the fifth track section 98, the ninth track section 108 and the eleventh track section 114. The tambour door within the first track section 86 may be hidden from view; the tambour door within the second track section 88 may function as a partial cover for a storage compartment 40. See FIG. 6. The tambour door in one of the fifth track section 98, the ninth track section 108, and the eleventh track section 114 may function as a horizontal shelf within a storage compartment 40. See FIG. 6.

A tambour door may slide rearward from the second track section 88 to the third track section 92 or to the fourth track section 94. The tambour door may slide forward from the fifth track section 98 to the third track section 92 or to the sixth track section 100. See FIG. 6. The tambour door may slide rearward from the eleventh track section 114 to the eighth track section 104 or to the tenth track section 110; the tambour door may also slide forward from the ninth track section 108 to the seventh track section 102 or to the tenth track section 110. The tambour door may move at different locations within the console 16 without removing the tambour door from the console 16. The tambour door may be used to cover the storage compartment 46, and/or may operate as a shelf within the support structure 18. See FIG. 6.

Figure 7:
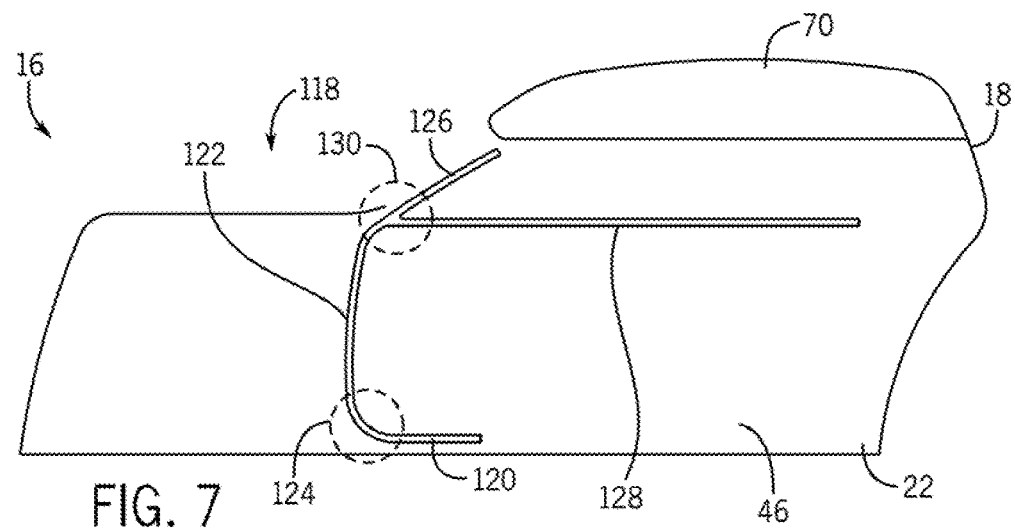
FIG. 7 is a schematic cross-section view of a console having a track configuration with multiple track sections for moving a tambour door between multiple positions according to an exemplary embodiment.

As shown schematically in FIG. 7, the console 16 may have the track configuration with multiple track sections for moving the tambour door between multiple positions according to an exemplary embodiment. The console 16 includes a track 118 coupled to and extending along the wall 22 of the support structure 18. According to an exemplary embodiment, the track 118 includes a first track section 120 and a second track section 122 joined at a first junction 124; the first track section 120 extends in a horizontal plane; the second track section 122 extends in a vertical plane. The first junction 124 is curved to join the first track section 120 and the second track section 122. See FIG. 7. The track 118 also includes a third track section 126 and a fourth track section 128 joined to a second track section 122 at a second junction 130; the second junction 130 is the T-junction or the Y-junction and joins the second track section 122, the third track section 126 and the fourth track section 128; the fourth track section 128 extends in a horizontal plane that is parallel to the first track section 120. The second track section 122, the third track section 126 and the fourth track section 128 form the Y-shape track or the T-shape track. See FIG. 7.

As shown schematically in FIG. 7, the tambour door is configured to slide within the first track section 120, the second track section 122, the third track section 126 and the fourth track section 128, and within the first junction 124 and a second junction 130. According to an exemplary embodiment, the tambour door may move within one of the first track section 120, the second track section 122, the third track section 126 and the fourth track section 128. See FIG.

7. The first track section 120 and the second track section 122 may be configured to conceal (or hide) the tambour door; the tambour door within the third track section 126 may function as a partial covering for the storage compartment 46. According to an exemplary embodiment, the tambour door within the third track sections 128 may function as a horizontal shelf within the storage compartment 46. See FIG. 7.

The tambour door may slide rearward from the second track section 122 to the third track section 126 or to the fourth track section 128. The tambour door may move at different locations within the console 16 without removing the tambour door from the console 16. The tambour door may be used to cover the storage compartment 46 and/or may operate as a shelf within the support structure 18. See FIG. 7.

Figure 8:
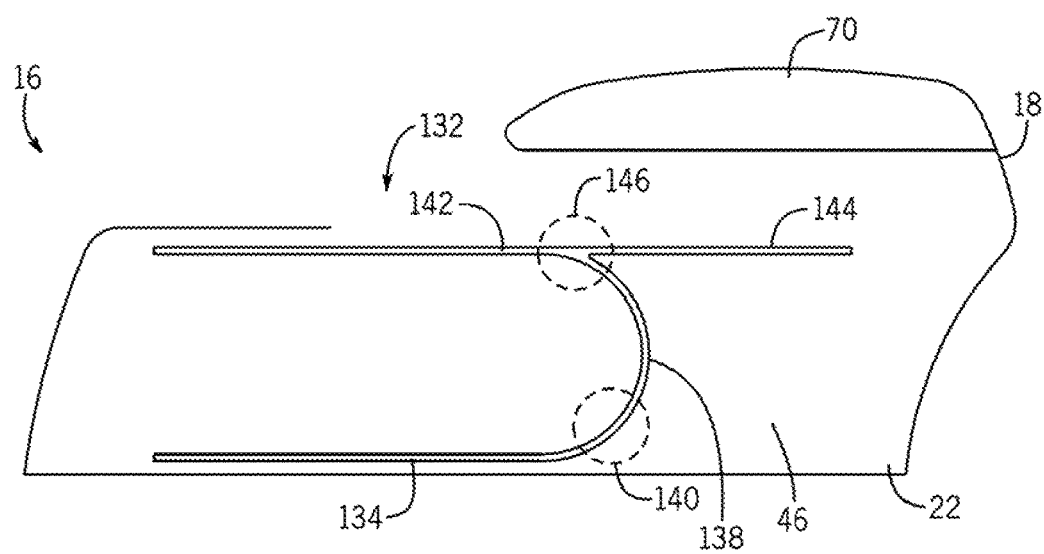
FIG. 8 is a schematic cross-section view of a console having a track configuration with multiple track sections for moving a tambour door between multiple positions according to an exemplary embodiment.

As shown schematically in FIG. 8, the console 16 may have the track configuration with multiple track sections for moving the tambour door between multiple positions according to an exemplary embodiment. The console 16 includes a track 132 coupled to and extending along the wall 22 of the support structure 18. The track 132 includes a first track section 134 and a second track section 138 joined at a first junction 140; the first track section 134 extends in a horizontal plane; the second track section 138 is curved and extends vertically in relation to the first track section 134. See FIG. 8. The first junction 140 is curved to join the first track section 134 and the second track section 138. The track 132 also includes the third track section 142 and the fourth track section 144 joined to the second track section 138 at the second junction 146; the second junction 146 is the T-junction or the Y-junction to join the second track section 138, the third track section 142 and the fourth track section 144. See FIG. 8.

The third track section 142 and the fourth track section 144 extend in a horizontal plane that is parallel to the first track section 134. As shown schematically in FIG. 8, the second track section 138, third track section 142 and the fourth track section 144 form the Y-shape track or the T-shape track. The first track section 134, the second track section 138 and the third track section 142 form the C-shape track. The track 132 may be used to move the tambour door within the fourth track section 144 to operate as a shelf and/or to move the tambour door within the first track section 134, the second track section 138 and the third track section 142 to provide as a cup holder, device holder, or other similar retaining feature.

Figure 9:
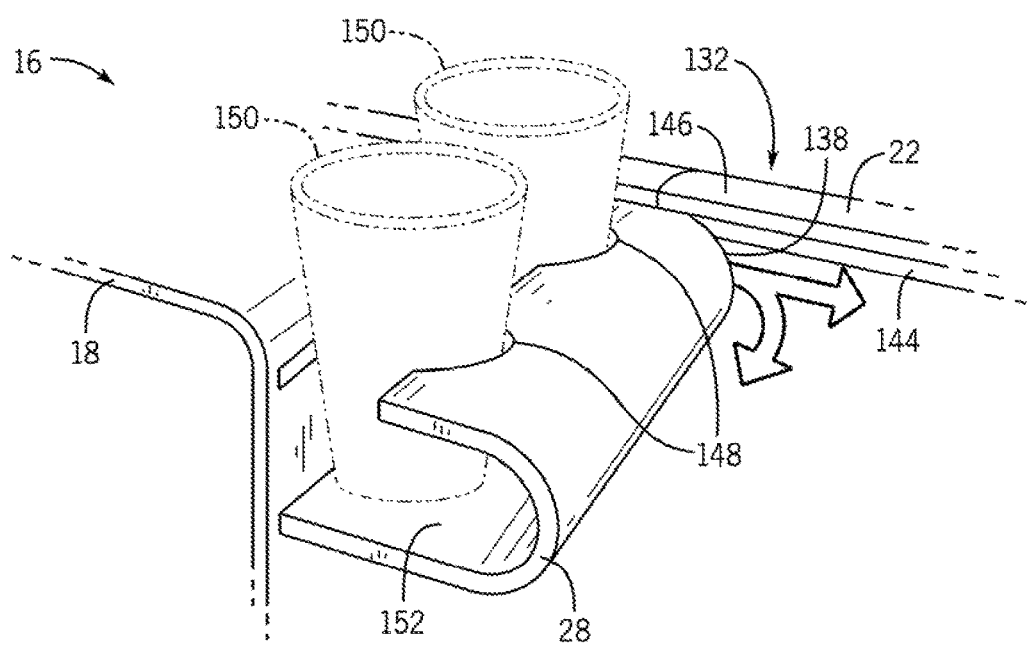
FIG. 9 is a schematic partial perspective view of the console of according to an exemplary embodiment.

As shown schematically in FIG. 9, the tambour door 28 may extend within the first track section 134, the second track section 138 and the third track section 142 to operate as a cup holder. See FIG. 8. The tambour door 28 may include notches 148 to catch cups 150 disposed within the cup holder formed by the tambour door 28; the tambour door 28 may also include a resting surface 152 for cups 150. See FIG. 9.

The tambour doors may be moved manually and/or automatically using various actuation arrangements (e.g., control systems, motors, switches, gears, etc.). The tracks may be coupled to any structure of the console 16 (or any other suitable device). The tracks may be coupled to the assembly (e.g. console 16). A track system may support multiple tambour doors.

Exemplary Embodiments

The present invention relates to a console for a vehicle interior. The console comprises a support structure, a track along the support structure and a tambour door supported by the track. The track comprises a first track section, a second track section and a third track section. The first track section, the second track section and the third track section extend from a junction. The tambour door is configured to slide within the first track section, the second track section and the third track section. The first track section is aligned with the second track section. The tambour door is configured to slide between the first track section and the second track section and between the first track section and the third track section. A structure configured to block the tambour door from sliding between the second track section and the third track section. The tambour door is configured to slide between the first track section and the second track section; between the first track section and the third track section; and between the second track section and the third track section. The junction comprises one of a T-junction or a Y-junction.

The present invention also relates to a component for a vehicle interior. The component comprises a support structure, a track along the support structure and a tambour door supported by the track. The track comprises a first track section, a second track section and a third track section. The first track section extends parallel to the third track section. The second track section connects the first track section to the third track section. The tambour door is configured to slide within the first track section, the second track section and the third track section. The support structure comprises a storage compartment. The tambour door is configured to divide the storage compartment into a first sub-compartment and a second sub-compartment. The tambour door is configured to provide a shelf for the storage compartment. The tambour door is configured to provide a cup holder. The tambour door is configured to be moved to a first position in which the tambour door is within the first track section and in a second position in which the tambour door is within the third track section. The tambour door is configured to be moved to a third position in which the tambour door is within the second track section. The first track section, the second track section and the third track section form a C-shape track, a U-shape track or an ∩-shape track.

The present invention further relates to a console for a vehicle interior. The console comprises a support structure comprising a storage area, a track system along the support structure and a tambour door configured for movement along the track system. The track system comprises a first track section, a second track section and a third track section. The first track section, the second track section and the third track section are joined at a first junction. The first track section, the second track section and the third track section are joined at a second junction. The first track section is configured to allow movement of the tambour door into a storage compartment within the support structure. The second track section is configured to allow movement of the tambour door above a first region of the storage compartment to block access to the first region. The third track section is configured to allow movement of the tambour door within a second region of the storage compartment to divide the second region into a first sub-region and a second sub-region. The tambour door is configured to slide within the first track section, the second track section, and the third track section. The third track section is configured perpendicular to the second track section and the first sub-region corresponds to the first region. The second track section is straight and aligned with the third track section. The first track section is joined to the second track section at the first junction and the second track section is joined to the third track section at the second junction. The tambour door is configured to be concealed in the storage compartment. A fourth track section joined to the second track section and the third track section at the second junction; the tambour door is configured to slide within the first track section, the second track section, the third track section and the fourth track section.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is therefore to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console for a vehicle interior comprising:
(a) a support structure;
(b) a track along the support structure; and
(c) a tambour door supported by the track;
wherein the track comprises a first track section, a second track section and a third track section;
wherein the first track section, the second track section and the third track section extend from a junction;
wherein the tambour door is configured to slide within the first track section, the second track section and the third track section;
wherein the first track section is connected to the second track section at the junction;
wherein the first track section is connected to the third track section at the junction; and
wherein the second track section is connected to the third track section at the junction.

2. The console of claim 1 wherein the first track section is aligned with the second track section.

3. The console of claim 1 wherein the tambour door is configured to slide between the first track section and the second track section and between the first track section and the third track section.

4. The console of claim 1 further comprising a structure configured to block the tambour door from sliding between the second track section and the third track section.

5. The console of claim 1 wherein the tambour door is configured to slide (a) between the first track section and the second track section; (b) between the first track section and the third track section; and (c) between the second track section and the third track section.

6. The console of claim 1 wherein the junction comprises one of a T-junction or a Y-junction.

7. A component for a vehicle interior comprising:
(a) a support structure comprising a storage compartment;
(b) a track along the support structure; and
(c) a tambour door supported by the track;
wherein the track comprises a first track section, a second track section and a third track section;
wherein the first track section extends parallel to the third track section;
wherein the second track section connects the first track section to the third track section;
wherein the tambour door is configured to slide within the first track section, the second track section and the third track section;
wherein when the tambour door is in the first track section the tambour door is configured to cover the storage compartment; and
wherein when the tambour door is in the third track section the tambour door is configured to divide the storage compartment into a first compartment and a second compartment.

8. The component of claim 7 wherein the tambour door is configured to provide a shelf for the storage compartment.

9. The component of claim 7 wherein the tambour door is configured to provide a cup holder.

10. The component of claim 7 wherein the tambour door is configured to be moved to a first position in which the tambour door is within the first track section and in a second position in which the tambour door is within the third track section.

11. The component of claim 10 wherein the tambour door is configured to be moved to a third position in which the tambour door is within the second track section.

12. The component of claim 7 wherein the first track section, the second track section and the third track section form a C-shape track or a U-shape track.

13. A console for a vehicle interior comprising:
(a) a support structure comprising a storage area;
(b) a track system along the support structure;
(c) a tambour door configured for movement along the track system;
wherein the track system comprises a first track section, a second track section and a third track section;
wherein the first track section, the second track section and the third track section are joined at a first junction;
wherein the first track section, the second track section and the third track section are joined at a second junction;
wherein the first track section is configured to allow movement of the tambour door into a storage compartment within the support structure;
wherein the second track section is configured to allow movement of the tambour door above a first region of the storage compartment to block access to the first region;
wherein the third track section is configured to allow movement of the tambour door within a second region of the storage compartment to divide the second region into a first sub-region and a second sub-region; and
wherein the tambour door is configured to slide within the first track section, the second track section, and the third track section.

14. The console of claim 13 wherein the third track section is configured perpendicular to the second track section and the first sub-region corresponds to the first region.

15. The console of claim 13 wherein the second track section is straight and aligned with the third track section.

16. The console of claim 13 wherein the first track section is joined to the second track section at the first junction and the second track section is joined to the third track section at the second junction.

17. The console of claim 13 wherein the tambour door is configured to be concealed in the storage compartment.

18. The console of claim 13 further comprising a fourth track section joined to the second track section and the third track section at the second junction; the tambour door is configured to slide within the first track section, the second track section, the third track section and the fourth track section.

* * * * *